United States Patent
Fukui et al.

(10) Patent No.: US 6,572,793 B2
(45) Date of Patent: Jun. 3, 2003

(54) METHOD OF PRODUCING CERAMIC COMPOSITION AND METHOD OF PRODUCING ELECTRONIC DEVICE

(75) Inventors: Takashi Fukui, Tokyo (JP); Yasuo Watanabe, Tokyo (JP); Mikio Takahashi, Tokyo (JP); Akira Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 130 days.

(21) Appl. No.: 09/810,620

(22) Filed: Mar. 19, 2001

(65) Prior Publication Data

US 2002/0010072 A1 Jan. 24, 2002

(30) Foreign Application Priority Data

Mar. 30, 2000 (JP) ........................... 2000-093416

(51) Int. Cl.[7] ................ C04B 35/46; C04B 35/465; C01G 23/00; C01G 25/00; H01B 3/12; H01L 41/08

(52) U.S. Cl. ............... 252/520.2; 252/62.3 BT; 252/62.9 R; 252/519.51; 252/62.9 P; 423/69; 423/76; 423/155; 423/598; 423/608; 423/635; 501/134; 501/135; 501/136; 501/137; 361/311; 361/313; 361/322; 361/321.1

(58) Field of Search ............. 252/62.3 BT, 62.9 P, 252/518.1, 519.1, 519.15, 519.51; 423/69, 76, 155, 592, 598, 608, 609, 610, 635; 501/134, 94, 138, 139; 361/311, 312, 322, 321.1, 321.4

(56) References Cited

U.S. PATENT DOCUMENTS

| 4,820,670 A | 4/1989 | Sano et al. | |
| 4,869,973 A | * 9/1989 | Nishikawa et al. | 313/503 |
| 4,897,219 A | 1/1990 | Noi et al. | |
| 5,790,367 A | 8/1998 | Mateika et al. | |

FOREIGN PATENT DOCUMENTS

| DE | 40 09 956 A1 | 10/1991 | ........... C04B/35/00 |
| JP | 59-227769 A | 12/1984 | ........... C04B/35/46 |
| JP | 61-174116 | * 8/1986 | ........... C01G/23/00 |
| JP | 62-24388 B2 | 5/1987 | ........... C04B/35/46 |
| JP | 63-224106 A | 9/1988 | ........... H01B/3/12 |
| JP | 63-224108 A | 9/1988 | ........... H01B/3/12 |
| JP | 63-224109 A | 9/1988 | ........... H01B/3/12 |
| JP | 4-14704 A | 1/1992 | ........... H01B/3/12 |
| JP | 4-206109 A | 7/1992 | ........... H01B/3/12 |
| JP | 04-206109 | * 7/1992 | ........... H01B/3/12 |
| JP | 5-18201 B2 | 3/1993 | ........... H01B/3/12 |
| JP | 11-97279 A | 4/1999 | ........... H01G/4/12 |

OTHER PUBLICATIONS

Hirata et al, Vibrational Spectroscopy and X–ray Diffraction of Perovskite Compounds Sr1–xMxTiO3 (M=Ca, Mg; O LEQ x LEQ 1), J. Solid State Chem. 1996 (124), 353–359.*

* cited by examiner

Primary Examiner—Mark Kopec
Assistant Examiner—Kallambella M Vijayakumar

(57) ABSTRACT

A method of producing an electronic device including a dielectric layer includes a dielectric ceramic composition containing a main component expressed by a formula of $\{(Sr_{1-x}Ca_x)O\}_m \cdot (Ti_{1-y}Zr_y)O_2$, wherein x fulfills $0 \leq x \leq 1.00$ and y fulfills $0 \leq y \leq 0.20$, and producing said dielectric ceramic composition by using a material expressed by a formula of $\{(Sr_{1-x}Ca_x)O\}_{m'} \cdot (Ti_{1-y}Zr_y)O_2$ wherein the mole ratio m' fulfills m'<m. It is possible to produce an electronic device, such as a chip capacitor, having excellent resistance to reducing during firing and excellent capacity-temperature characteristics after firing, wherein the insulation resistance is hard to be deteriorated particularly when made to be a thin layer and defect rate of the initial insulation resistance is low.

11 Claims, 2 Drawing Sheets

METHOD OF PRODUCING CERAMIC COMPOSITION AND METHOD OF PRODUCING ELECTRONIC DEVICE

BACKGROUND OF THE INVENTION

1. Field of the Invention

The present invention relates to a method of producing a dielectric ceramic composition used, for example, as a dielectric layer of a multi-layer ceramic capacitor and a method of producing an electronic device using the dielectric ceramic composition as a dielectric layer.

2. Description of the Related Art

A multi-layer ceramic capacitor as an example of electronic devices is formed by printing a conductive paste on a green sheet comprised of a predetermined dielectric ceramic composition, stacking a plurality of green sheets printed the conductive paste thereon and being fired the green sheet and internal electrodes as one body.

A dielectric ceramic composition had a characteristic that it is reduced and becomes semiconductive when fired in a neutral or reducing atmosphere having a low oxygen partial pressure. Therefore, when producing a multi-layer ceramic capacitor, it was inevitable to fire in an oxidizing atmosphere having a high oxygen partial pressure. Accordingly, as an internal electrode material to be fired at a time with the dielectric ceramic composition, it is necessary to use an expensive noble metal, such as palladium and platinum, which does not melt at a temperature the dielectric ceramic composition sinters and is not oxidized when being fired in the oxidizing atmosphere, so it has been a large obstacle for lowering the cost of the multi-layer ceramic capacitor to be produced.

On the other hand, to use an inexpensive base metal, such as nickel and copper, as an internal electrode material, it is necessary to develop a dielectric ceramic composition having characteristics of not becoming semiconductive by being fired at a low temperature in a neutral or reducing atmosphere, that is having excellent resistance to reducing, showing sufficient dielectric constant and excellent dielectric characteristics (for example, having a small capacity-temperature change rate) after firing.

A variety of proposals have been made for dielectric ceramic composition wherein a base metal can be used as an internal electrode material in the related art.

For example, The Japanese Unexamined Patent Publication No. 1988-224108 discloses a dielectric ceramic composition containing as a main component a dielectric oxide having a composition expressed by $(Sr_{1-x}Ca_x)_m(Ti_{1-y}Zr_y)O_3$ (note that $0.30 \leq x \leq 0.50$, $0.03 \leq y \leq 0.20$, $0.95 \leq m \leq 1.08$) and containing as subcomponents Mn (converted to $MnO_2$) for 0.01 to 2.00 parts by weight and $SiO_2$ for 0.10 to 4.00 parts by weight with respect to 100 parts by weight of the main component.

The Japanese unexamined Patent Publication No. 1988-224109 discloses a dielectric ceramic composition further containing ZnO for 0.01 to 1.00 parts by weight with respect to the above main component in addition to the above Mn and $SiO_2$.

The Japanese Unexamined Patent Publication No. 1992-206109 discloses a dielectric ceramic composition containing as a main component a dielectric oxide having a composition expressed by $(Sr_{1-x}Ca_x)_m(Ti_{1-y}Zr_y)O_3$ (note that $0.30 \leq x \leq 0.50$, $0.00 \leq y \leq 0.20$, $0.95 \leq m \leq 1.08$) and the particle diameter is made to be in the range of 0.1 to 1.0 μm.

The Japanese Examined Patent Publication No. 1987-24388 discloses a dielectric ceramic composition containing as a main component a dielectric oxide having a composition expressed by $MeO_k TiO_2$ (note that Me is a metal selected from Sr, Ca and Sr+Ca, and k is 1.00 to 1.04) and 0.2 to 10.0 parts by weight of a glass component with respect to 100 parts by weight of the main component wherein $Li_2O$, M (note that M is at least one kind of metal oxide selected from BaO, CaO and SrO) and $SiO_2$ are used at a predetermined mole ratio.

The Japanese Unexamined Patent Publication No. 1984-227769 discloses a dielectric ceramic composition containing as a main component a dielectric oxide having a composition expressed by $\{(Sr_{1-x}Ca_x)O\}_k \cdot TiO_2$ (note that $0 \leq x \leq 1.00$, $1.00 \leq k \leq 1.04$) and 0.2 to 10.0 parts by weight of a glass component with respect to 100 parts by weight of the main component wherein $Li_2O$, M (note that M is at least one kind of metal oxide selected from BaO, CaO and SrO) and $SiO_2$ are used at a predetermined mole ratio.

The Japanese Unexamined Patent Publication No. 1988-224106 discloses a dielectric ceramic composition containing as a main component a dielectric oxide having a composition expressed by $(Sr_{1-x}Ca_x)_m(Ti_{1-y}Zr_y)O_3$ (note that $0.30 \leq x \leq 0.50$, $0.03 \leq y \leq 0.20$, $0.95 \leq m \leq 1.08$) and containing as a subcomponent 0.01 to 2.00 parts by weight of Mn (converted to $MnO_2$), 0.10 to 4.00 parts by weight of $SiO_2$ and 0.01 to 1.00 parts by weight of Mo (converted to MoO) with respect to 100 parts by weight of the main component.

The Japanese Unexamined Patent Publication No. 1992-14704 discloses a dielectric ceramic composition containing as a main component a dielectric oxide having a composition expressed by $(Sr_xCa_{1-x})(Zr_y Ti_{1-y})O_3$ (note that $0.59 \leq x \leq 0.65$, $0 \leq y \leq 0.1$) and containing less than 3.0 parts by weight of $SiO_2$ (note that 0 parts by weight is not included) with respect to 100 parts by weight of the main component.

However, there have been disadvantages in the dielectric ceramic compositions described in the publications that insulation resistance (IR) is liable to decline particularly when made to be a thin film, and when producing a multi-layer ceramic capacitor having a base metal internal electrode by using the dielectric ceramic composition, an defect rate of an initial insulation resistance of an obtained multi-layer ceramic capacitor increases.

SUMMARY OF THE INVENTION

An object of the present invention is to provide a method of producing a dielectric ceramic composition, having excellent resistance to reducing during firing and excellent capacity-temperature characteristics after firing, and a method of producing an electronic device, such as a chip capacitor wherein the insulation resistance is hard to be deteriorated particularly when made to be a thin layer and an defect rate of the initial insulation resistance is low.

To attain the above object, according to a first aspect of the present invention, there is provided a method of producing a dielectric ceramic composition containing a main component expressed by a composition formula of $(AO)_m \cdot BO_2$, wherein the element A in said composition formula is at least one element selected from Sr, Ca and Ba, and the element B in said composition formula is at least one element selected from Ti and Zr, characterized by producing the dielectric ceramic composition by using a source material expressed by a composition formula of $(AO)_{m'} \cdot BO_2$, wherein the mole ratio m' in said composition formula fulfills m'<m.

Preferably, said dielectric ceramic composition is produced by firing after adding to said source material a substance containing said element A. More preferably, said dielectric ceramic composition is produced by firing after adding to said source material a substance containing said element A, without adding a substance containing said element B.

To attain the above object, particularly preferable embodiment is a method of producing a dielectric ceramic composition according to the second aspect of the present invention below.

According to the second aspect of the present invention, there is provided a method of producing a dielectric ceramic composition containing a main component expressed by a composition formula of $\{(Sr_{1-x}Ca_x)O\}_m \cdot (Ti_{1-y}Zr_y)O_2$ wherein the code x in said composition formula fulfills $0 \leq x \leq 1.00$ and the code y in said composition formula fulfills $0 \leq y \leq 0.20$, characterized by producing the dielectric ceramic composition by using a source material expressed by a composition formula of $\{(Sr_{1-x}Ca_x)O\}_{m'} \cdot (Ti_{1-y}Zr_y)O_2$, wherein the mole ratio m' in said composition formula fulfills m'<m.

Preferably, said dielectric ceramic composition is produced by firing after adding to said source material a substance containing at least one element of said Sr and Ca. More preferably, said dielectric ceramic composition is produced by firing after adding to said source material a substance containing at least one element of said Sr and Ca, without adding a substance containing Ti.

Preferably, relationship of the mole ratios m and m' in said composition formula fulfills m−m'<0.085.

Preferably, the mole ratio m in the composition formula in the main component of said dielectric ceramic composition fulfills 0.94<m<1.08.

To attain the above object, according to the first aspect of the present invention, there is provided a method of producing an electronic device comprising a dielectric layer includes a dielectric ceramic composition containing a main component expressed by a composition formula of $(AO)_m \cdot BO_2$, wherein the element A in said composition formula is at least one element selected from Sr, Ca and Ba, and the element B in said composition formula is at least one element selected from Ti and Zr, characterized by producing said dielectric ceramic composition by using a material expressed by a composition formula of $(AO)_{m'} \cdot BO_2$, wherein the mole ratio m' in said composition formula fulfills m'<m.

To attain the above object, particularly preferable embodiment is a method of producing an electronic device according to the second aspect of the present invention below.

According to the second aspect of the present invention, there is provided a method of producing an electronic device comprising a dielectric layer includes a dielectric ceramic composition containing a main component expressed by a composition formula of $\{(Sr_{1-x}Ca_x)O\}_m \cdot (Ti_{1-y}Zr_y)O_2$, wherein the code x in said composition formula fulfills $0 \leq x \leq 1.00$ and the code y in said composition formula fulfills $0 \leq y \leq 0.20$, characterized by producing said dielectric ceramic composition by using a source material expressed by a composition formula of $\{(Sr_{1-x}Ca_x)O\}_{m'} \cdot (Ti_{1-y}Zr_y)O_2$, wherein the mole ratio m' in said composition formula fulfills m'<m.

It has been made clear by the present inventors that an insulation resistance error occurs when producing a dielectric ceramic composition containing a main component expressed by the composition formula of $(AO)_m \cdot BO_2$ and especially when it is made to be a thin film. Causes thereof are not always clear, but it is considered that a segregation phase wherein an element B becomes rich in the dielectric ceramic composition after firing and that the insulation resistance and a dielectric constant of the dielectric decline.

In a method of producing a dielectric ceramic composition according to the first aspect of the present invention, it is possible to produce a dielectric ceramic composition having a high resistance to reducing during firing and excellent capacity-temperature characteristics after firing, wherein insulation resistance is hard to decline when it is made to be a thin layer of, for example, about 4 μm by producing the above dielectric ceramic composition by using the material expressed by the composition formula of $(AO)_{m'} \cdot BO_2$ having a smaller mole ratio m' than a mole ratio m after firing. By using the material satisfying m'<m, an element B is not necessarily added thereafter before firing and it is considered that the above element B can prevent generation of a rich segregation phase.

In a method of producing a dielectric ceramic composition according to the second aspect of the present invention, by producing the above dielectric ceramic composition by using a material expressed by a composition formula of $\{(Sr_{1-x}Ca_x)O\}_{m'} \cdot (Ti_{1-y}Zr_y)O_2$ having a smaller mole ratio m' than a mole ratio m after firing, the element B can prevent generation of a rich segregation phase due to the same reason, accordingly, a dielectric ceramic composition having a high resistance to reducing during firing and excellent capacity-temperature characteristics after firing, wherein an insulation resistance is hard to decline when it is made to be a thin layer of, for example, about 4 μm, can be produced. The above facts are found by the present inventors for the first time.

By a method of producing an electronic device according to the first and second aspects of the present invention, an electronic device like a chip capacitor, etc. in which an defect rate of an initial insulation resistance is small can be produced.

The present disclosure relates to subject matter contained in Japanese Patent Application No. 2000-93416 (filed on March 30), the disclosure of which is expressly incorporated herein by reference in its entirety.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Figure 1:
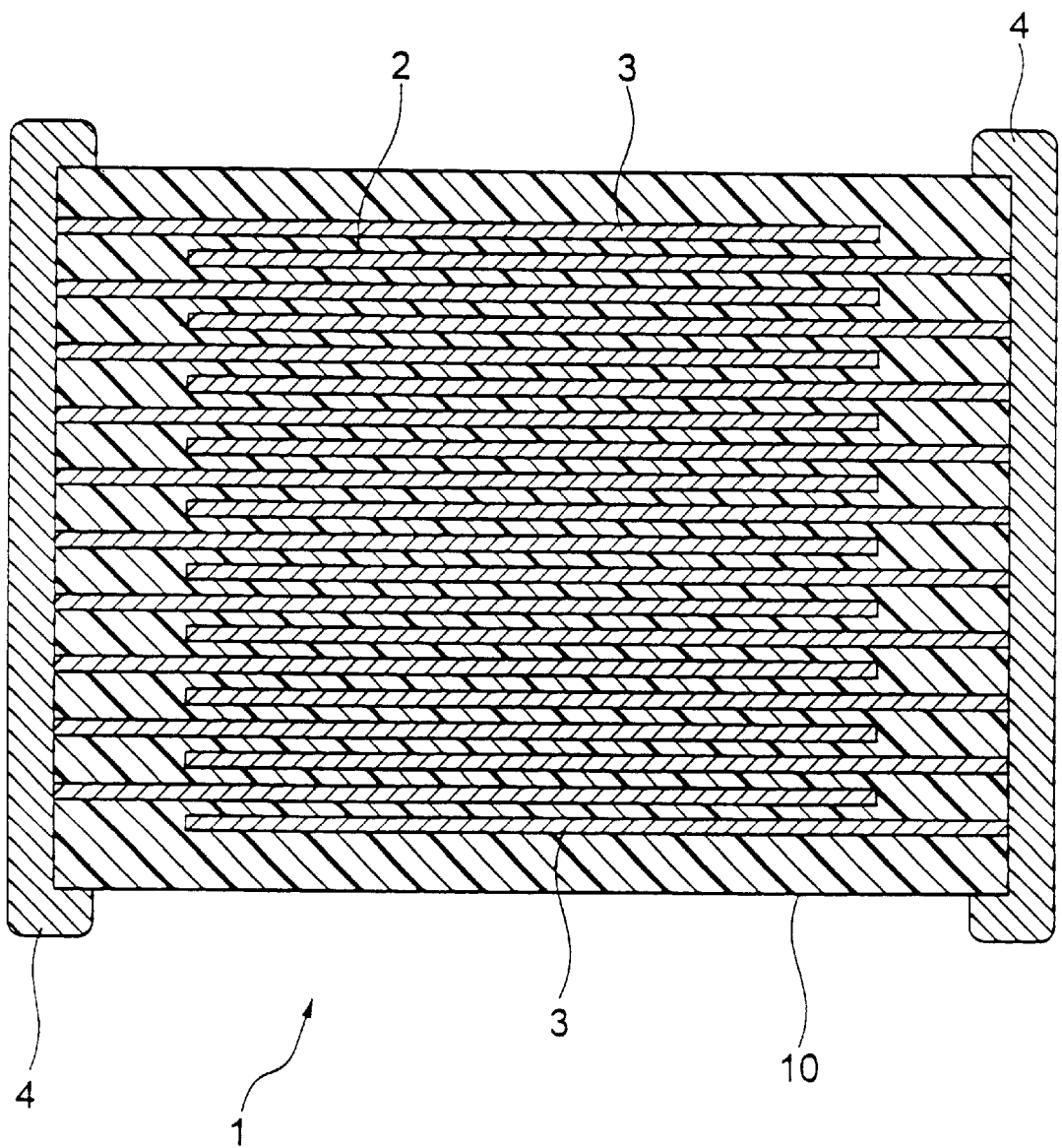
FIG. 1 is a sectional view of a multi-layer ceramic capacitor according to an embodiment of the present invention.

Below, the present invention will be explained based on an embodiment shown in the drawings.

Before explaining a method of producing a dielectric ceramic composition according to the present invention, a multi-layer ceramic capacitor will be explained first.

Multi-Layer Ceramic Capacitor

As shown in FIG. 1, a multi-layer ceramic capacitor 1 as an electronic device according to an embodiment of the present invention comprises a capacitor element body 10 having a configuration wherein dielectric layers 2 and internal electrode layers 3 are alternately stacked.

On the both end portions of the capacitor element body 10 are formed the internal electrode layers 3 alternately arranged inside the element body 10 and a pair of external electrodes 4 being conductive to each other. A shape of the capacitor element body 10 is not specifically limited, but normally a rectangular parallelepiped shape. Also, a size thereof is not specifically limited and may be a suitable size in accordance with the application but is normally about (0.6 to 5.6 mm)×(0.3 to 5.0 mm)×(0.3 to 1.9 mm).

The internal electrode layers 3 are stacked so that the respective end surfaces are alternately exposed to surfaces of facing two end portions of the capacitor element body 10. The pair of external electrodes 4 are formed on the both end portions of the capacitor element body 10 and connected to the exposed end surfaces of the alternately arranged internal electrode layers 3 to configure a capacitor circuit.

Dielectric Layer 2

The dielectric layer 2 contains a dielectric ceramic composition obtained by a method of producing the present invention. The dielectric ceramic composition obtained by a production method according to an embodiment of the present invention contains a main component expressed by a composition formula of $\{(Sr_{1-x}Ca_x)O\}_m \cdot (Ti_{1-y}Zr_y)O_2$, which is an embodied composition formula of $(AO)_m \cdot BO_2$. At this time, an oxygen (O) amount may be a little different from the stoichiometric composition of the above formula.

In the above formula, the code x satisfies $0 \leq x \leq 1.00$, preferably, $0.30 \leq x \leq 0.50$. The x expresses the number of Ca atoms, and by changing x, that is changing a Ca/Sr ratio, a phase transition point of a crystal can be freely shifted. Therefore, a capacity-temperature coefficient and a dielectric constant can be freely controlled. When x is made to be within the above range, the phase transition point comes close to a room temperature and temperature characteristics of a capacitance can be improved. Note that the ratio of Sr and Ca can be any and only one of the two may be contained in the present invention.

In the above formula, the code y satisfies $0 \leq y \leq 0.20$, preferably, $0 \leq y \leq 0.10$. By making y not more than 0.20, declining of a dielectric constant can be prevented. The y indicates the number of Zr atoms, and there is a tendency that resistance to reducing is further increased by exchanging $ZrO_2$ which is harder to be reduced comparing with $TiO_2$. Note that the present invention does not necessarily contain Zr and may contains only Ti.

In the above formula, a mole ratio m satisfies $0.94 < m < 1.08$, preferably, $0.970 \leq m \leq 1.030$. By making m larger than 0.94, becoming semiconductive due to firing in a reducing atmosphere can be prevented, while by making m less than 1.08, a densified sintered body can be obtained without making the firing temperature higher.

A dielectric ceramic composition may be added a predetermined amount of a first subcomponent containing at least one selected from oxides of V, Nb, W, Ta and Mo and/or compounds which become oxides after firing. By adding such a predetermined amount of first subcomponent, low temperature firing becomes possible without declining dielectric characteristics and accelerating lifetime (highly accelerated life time) of insulation resistance can be improved even when the dielectric layer is made to be a thin layer. When adding the first subcomponent, the ratio of the first subcomponent with respect to 100 moles of the above main component is $0.01\text{ mole} \leq \text{first subcomponent} < 2$ moles, preferably $0.04\text{ mole} \leq \text{first subcomponent} \leq 0.6$ mole, wherein the ratio of the first subcomponent is calculated as a conversion mole ratio of the metal element in the oxide.

The dielectric ceramic composition may be also added a predetermined amount of a second subcomponent containing an oxide of Mn (for example, MnO) and/or compound which becomes an oxide of Mn by firing (for example, $MnCO_3$). The second subcomponent brings effects of promoting sintering, improving a highly accelerated life time, and reducing the defect rate of an initial insulation resistance (IR) when the dielectric layer 2 is made to be a thin layer of, for example, about 4 μm. When adding the second subcomponent, the ratio of the second subcomponent with respect to 100 moles of the above main component is $0\text{ mole} \leq \text{second subcomponent} < 4$ moles, preferably, $0.05\text{ mole} \leq \text{second subcomponent} \leq 1.4$ moles, wherein the ratio of the second subcomponent is calculated as a conversion mole ratio of the metal element in the oxide.

The dielectric ceramic composition may be added a predetermined amount of a third subcomponent containing at least one selected from $SiO_2$, MO (note that M is at least one element selected from Ba, Ca, Sr and Mg), $Li_2O$ and $B_2O_3$. The third subcomponent acts mainly as a sintering auxiliary agent. When adding the third subcomponent, the ratio of the third subcomponent with respect to 100 moles of the above main component is $0\text{ mole} < \text{third subcomponent} < 15$ moles, preferably $0.2\text{ mole} \leq \text{third subcomponent} \leq 6$ moles, wherein the ratio of the third subcomponent is calculated as a conversion mole ratio of the oxide.

The dielectric ceramic composition may be added a predetermined amount of a fourth subcomponent containing an oxide of R (note that R is at least one kind selected from Sc, Y, La, Ce, Pr, Nd, Pm, Sm, Eu, Gd, Tb, Dy, Ho, Er, Tm, Yb and Lu). The fourth subcomponent has an effect of improving the highly accelerated life time. When adding the fourth subcomponent, the ratio of the fourth subcomponent with respect to 100 moles of the above main component is $0.02\text{ mole} \leq \text{fourth subcomponent} < 2$ moles, preferably $0.02\text{ mole} \leq \text{fourth subcomponent} \leq 0.6$ mole, wherein the ratio of the fourth subcomponent is calculated as a conversion mole ratio of the R in the oxide.

Note that conditions, such as the number of stacked layers and a thickness of the dielectric layer 2 shown in FIG. 1, may be suitably determined in accordance with an object and application. Also, the dielectric layer 2 is composed of grains and grain boundary phase and an average particle diameter of the grains of the dielectric layer 2 is preferably about 1 to 5 μm. This grain boundary phase normally contains as a component an oxide of a material composing the dielectric material or internal electrode material, an oxide of a separately added material and further an oxide of a material to be mixed as an impurity during the process, and configured by a normal glass or a vitreous material.

Internal Electrode Layer 3

The electroconductive material contained in the internal electrode layers 3 is not particularly limited, but a base metal may be used since the material constituting the dielectric layers 2 has resistance to reducing. As the base metal used as the electroconductive material, Ni or an Ni alloy is preferable. As the Ni alloy, an alloy of at least one type of element selected from Mn, Cr, Co, and Al with Ni is preferable. The content of the Ni in the alloy is preferably not less than 95 wt %. Note that the Ni or Ni alloy may contain P, Fe, Mg and other various types of trace components in an amount of not more than 0.1 wt % or so.

The thickness of the internal electrode layer may be suitably determined in accordance with the application etc., but is usually 0.5 to 5 μm, in particular 1 to 2.5 μm or so is preferable.

External Electrodes 4

The electroconductive material contained in the external electrodes 4 is not particularly limited, but usually Cu, Cu alloy, Ni, or Ni alloy, etc. is used. Note that of course Ag, Ag—Pd alloy, etc. can be also used. Note that inexpensive Ni, Cu, or alloys of the same are used in the present invention. The thickness of the external electrodes may be suitably determined in accordance with the application etc., but usually 10 to 50 μm or so is preferable.

Method of Producing Multi-Layer Ceramic Capacitor

The multi-layer ceramic capacitor 1 produced by using a method of producing the dielectric ceramic composition according to the present invention is produced by preparing a green chip by the usual printing method or sheet method which uses pastes, sintering the green chip, then printing or transferring the external electrodes and sintering the same. The method of production will be explained in detail below.

A dielectric layer paste, internal electrode paste and external electrode paste are separately produced.

Dielectric Layer Paste

First, a dielectric ceramic composition source material contained in the dielectric layer paste is prepared. A main component source material and subcomponents (first to fourth subcomponents) source material to be added in accordance with need are used for the dielectric ceramic composition source material.

As the first subcomponent source material, at least one kind of a single oxide or composite oxide selected from oxides of V, Nb, W, Ta and Mo and/or compounds which becomes oxides of the same after firing is used.

As the second subcomponent source material, at least one kind of a single oxide or composite oxide selected from an oxide of Mn and/or compounds which becomes an oxide of Mn after firing is used.

As the third subcomponent source material, at least one kind selected from $SiO_2$, MO (note that M is at least one kind of element selected from Ba, Ca, Sr and Mg), $Li_2O$ and $B_2O_3$ is used.

As the fourth subcomponent source material, an oxide of R (note that R is at least one kind of element selected from Sc, Y, La, Ce, Pr, Nd, Pm, Sm, Eu, Gd, Tb, Dy, Ho, Er, Tm, Yb and Lu) is used.

In the present embodiment, a material expressed by a composition formula of $\{(Sr_{1-x}Ca_x)O\}_{m'}\cdot(Ti_{1-y}Zr_y)O_2$ is used as a main component source material.

The mole ratio m' of the above composition formula is smaller than the mole ratio m of the above dielectric ceramic composition after firing expressed by a composition formula of $\{(Sr_{1-x}Ca_x)O\}_m\cdot(Ti_{1-y}Zr_y)O_2$ (m'<m). By making m' smaller than m, an insulation resistance becomes hard to decline even when the above dielectric layer 2 is made to be a thin layer of, for example, about 4 μm and the defect rate of an initial insulation resistance can be low.

It is sufficient if the mole ratio m' is smaller than the mole ratio m and the degree is not specifically limited, but preferably m−m'<0.085, more preferably m−m'<0.04. When it falls to m−m'≧0.085, there is a possibility that a densified sintered body cannot be obtained even at a high temperature of 1380° C. By making m−m'<0.085, there arises an advantage that the above effects obtained when the dielectric layer is made to be a thin film become still more remarkable.

Such a source material expressed by the composition formula of $\{(Sr_{1-x}Ca_x)O\}_{m'}\cdot(Ti_{1-y}Zr_y)O_2$ may be obtained by a so-called liquid phase method besides a so-called solid phase method.

The solid phase method is a method of obtaining the material, when using $SrCO_3$, $CaCO_3$, $TiO_2$ and $ZrO_2$ as starting materials, by measuring predetermined amounts of the same, mixing, calcining, and grinding. As the liquid phase method, an oxalate method, hydrothermal synthesis method, sol-gel method, etc. can be mentioned.

Note that when compounding the material by combining ⌈a⌋ mole of $Sr_{t'}TiO_3$, ⌈b⌋ mole of $Ca_{t'}TiO_3$, ⌈c⌋ mole of $Sr_{t''}ZrO_3$ and ⌈d⌋ mole of $Ca_{t'''}ZrO_3$, m' can be obtained by m'=(at+bt'+ct"+dt''')/(a+b+c+d).

An explanation will be made by taking calcining by the solid phase method as an example.

First, a material before the calcining is prepared by measuring, mixing and drying the respective materials, such as $SrCO_3$, $CaCO_3$, $TiO_2$ and $ZrO_2$ so as to attain the predetermined m'.

Next, the prepared powder before calcining is subjected to calcining. Conditions of the calcining is not specifically limited but it is preferable to carry out under conditions below. A temperature rise rate is preferably 50 to 400° C./hour, more preferably 100 to 300° C./hour. A holding temperature is preferably 700 to 1300° C., more preferably 700 to 1200° C. A temperature holding time is preferably 0.5 to 6 hours, more preferably 1 to 3 hours. a processing atmosphere is preferably in the air and in nitrogen.

The powder after calcining is roughly grinded by an alumina roll etc., it is mixed with material powder so as to attain the composition formula of $\{(Sr_{1-x}Ca_x)O\}_m\cdot(Ti_{1-y}Zr_y)O_2$ of the final product. At this time, subcomponents (first to fourth subcomponents) materials may be added in accordance with need. Note that the above respective subcomponent materials to be added in accordance with need may be added to the above main component material before the calcining. Since m'<m, the material powder to attain the composition formula of the final product is powder of a substance containing a larger amount of Sr and/or Ca than an amount of Ti and/or Zr. More preferably, the substance does not contain Ti and/or Zr but contains Sr and/or Ca.

After that, the mixed powder is mixed by a ball mill and dried in accordance with need, as a result a dielectric ceramic composition material having the composition of the present invention can be obtained.

In the present invention, a predetermined material having smaller m' than m of a dielectric oxide to be contained in the main component in the dielectric ceramic composition after firing is prepared as explained above, then, a predetermined amount of material which is insufficient with respect to the final composition is added thereafter for adjusting to be the final composition, so that a dielectric ceramic composition material is obtained. By using the material produced as such for later explained firing, the possibility of generating a segregation phase particularly being Ti rich in the dielectric ceramic composition after firing is reduced, and an insulation resistance and the dielectric constant of the dielectric can be prevented from declining. Particularly, by not adding Ti at the time of subsequent adding, the above effects become remarkable.

Note that as a compound which becomes an oxide due to firing, for example, carbonates, nitrates, oxalates, and organic metal compounds can be mentioned. Of course, an oxide and a compound which becomes an oxide by firing may be used together. The content quantity of the respective compounds in the dielectric ceramic composition material may be suitably determined so as to give the above-mentioned composition of the dielectric ceramic composition after firing. The particle diameter of the dielectric ceramic composition powder is usually about 0.0005 to 5 μm in average in a state before being made to be a paint.

Next, the dielectric ceramic composition material is made to be paint to prepare a dielectric layer paste. The dielectric layer paste may be an organic-based paint comprised of a mixture of a dielectric ceramic composition material and an organic vehicle and may also be a water-based paint.

The organic vehicle is comprised of a binder dissolved in an organic solvent. The binder used for the organic vehicle is not particularly limited, but may be suitably selected from ethyl cellulose, polyvinyl butyral, and other ordinary types of binders. Further, the organic solvent used at this time is also not particularly limited and may be suitably selected from terpineol, butyl carbitol, acetone, toluene, and other organic solvents in accordance with the printing method, sheet method, or other method of use.

Further, a water-based paint is a water-based binder or dispersant etc. dissolved in water. The water-based binder is not particularly limited and may be suitably selected from polyvinyl alcohol, cellulose, water-based acrylic resin, emulsion, etc.

Internal Electrode Paste, External Electrode Paste

The internal electrode layer paste is prepared by kneading the electroconductive material comprised of the above various types of dielectric metals and alloys or various types of oxides forming the above electroconductive materials after firing, an organic metal compound, resinate, etc. together with the above organic vehicle. The external electrode paste may be prepared in the same way as the above internal electrode layer paste.

The content quantity of the organic vehicle in the above pastes is not particularly limited and may fall within the usual content, for example, the binder may be contained in an amount of 1 to 5 wt % or so and the solvent 10 to 50 wt % or so. Further, the pastes may include, in accordance with need, various types of additives selected from dispersants, plasticizers, dielectrics, insulators, etc.

When using a printing method, the dielectric paste and the internal electrode layer paste are successively printed on the polyethylene terephthalate or other substrate. The result is then cut into a predetermined shape, then the pastes are peeled off from the substrate to form a green chip. On the other hand, when using a sheet method, a dielectric paste is used to form a green sheet, the internal electrode layer paste is printed on top of this, then these are stacked to form a green chip.

Then, the green chip is processed to remove the binder and fired.

Binder Removing Processing

This processing for removing the binder may be performed under ordinary conditions, but when using Ni or an Ni alloy or other base metal for the electroconductive material of the internal electrode layer, this is preferably performed under the conditions that in the air atmosphere, the rate of temperature rise is 5 to 300° C./hour, in particular 10 to 100° C./hour, a holding temperature is 180 to 400° C., in particular 200 to 300° C., a temperature holding time is 0.5 to 24 hours, in particular 5 to 20 hours.

Firing

The atmosphere when firing the green chip may be suitably determined in accordance with the type of the electroconductive material in the internal electrode layer paste, but when using Ni or an Ni alloy or other base metal as the electroconductive material, the oxygen partial pressure in the firing atmosphere is preferably made $10^{-10}$ to $10^{-3}$ Pa, more preferably, $10^{-10}$ to $6\times10^{-5}$ Pa. If the oxygen partial pressure is too low, the electroconductive material of the internal electrode layers becomes abnormally sintered and ends up breaking in the middle, while, if the oxygen partial pressure is too high, the internal electrode layers tend to be oxidized.

The holding temperature at the time of firing is preferably 1000 to 1400° C., more preferably 1200 to 1380° C. If the holding temperature is too low, the densification becomes insufficient, while if too high, there is a tendency toward breaking of the electrodes due to abnormal sintering of the internal electrodes and deterioration of the capacity-temperature characteristic due to dispersion of the material comprising the internal electrode layers.

The various firing conditions other than the above are that preferably the rate of temperature rise is 50 to 500° C./hour, in particular 200 to 300° C./hour, a temperature holding time is 0.5 to 8 hours, in particular 1 to 3 hours, the cooling rate is 50 to 500° C./hour, in particular 200 to 300° C./hour, and the firing atmosphere is preferably a reducing atmosphere. As the atmospheric gas, for example, it is preferable to use a wet mixed gas of $N_2$ and $H_2$.

When firing in a reducing atmosphere, the sintered body of the capacitor chip is preferably annealed (heat treatment).

Annealing (Heat Treatment)

The annealing process is for re-oxidizing the dielectric layer. Due to this, the insulation resistance can be increased. The oxygen partial pressure in the annealing atmosphere is preferably not less than $10^{-4}$ Pa, more preferably, $10^{-1}$ to 10 Pa. If the oxygen partial pressure is to low, re-oxidation of the dielectric layer 2 becomes difficult, while if too high, the internal electrode layers 3 tend to be oxidized.

The holding temperature at the time of annealing is preferably not more than 1100° C., in particular 500 to 1100° C. If the holding temperature is too low, the re-oxidation of the dielectric layers becomes insufficient, so the insulation resistance tends to decline and the accelerating lifetime becomes shorter. On the other hand, when the holding temperature is too high, not only do the internal electrode layers oxidize and the capacity fall, but also the internal electrode layers end up reacting with the dielectric material resulting in a tendency toward deterioration of the capacity-temperature characteristic, a fall in the insulation resistance, and a fall in the accelerating lifetime. Note that the annealing may be comprised of only a temperature raising process and temperature reducing process. In this case, the temperature holding time becomes zero and the holding temperature is synonymous with the maximum temperature.

The various conditions other than the above conditions in annealing are that a temperature holding time is preferably 0 to 20 hours, in particular 6 to 10 hours, the cooling rate is preferably 50 to 500° C./hour, in particular 100 to 300° C./hour. As the atmospheric gas for annealing, for example, wet $N_2$ gas is preferable.

Note that in the same way as in the above firing, in the processing for removing the binder and the annealing, for example, a wetter etc. may be used to wet the $N_2$ gas or mixed gas. In this case, the temperature of the water is preferably 5 to 75° C.

The processing for removing the binder, firing, and annealing may be performed consecutively or independently. When performing these consecutively, preferably, after processing to remove the binder, the atmosphere is changed without cooling, then the temperature is raised to the holding temperature for firing, the firing performed, then cooled, the atmosphere is changed when the holding temperature of the annealing is reached, and then annealing is performed. On the other hand, when performing these independently, as to firing, it is preferable that the temperature is raised to the holding temperature at the time of the processing for removing the binder in an $N_2$ gas or wet $N_2$ gas atmosphere, then the atmosphere is changed and the temperature is further raised. Preferably, the chip is cooled to the holding temperature of the annealing, then the atmosphere changed again to an $N_2$ gas or wet $N_2$ gas atmosphere and the cooling continued. Further, at the time of annealing, the temperature may be raised to the holding temperature in an $N_2$ gas atmosphere, then the atmosphere changed or the entire annealing process may be performed in a wet $N_2$ gas atmosphere.

The thus obtained capacitor device body is, for example, end polished using barrel polishing or sandblasting etc., then printed or transferred with an external electrode paste and fired to form the external electrodes 4. The firing conditions of the external electrode paste are, for example, preferably 600 to 800° C. for 10 minutes to 1 hour or so in a wet mixed gas of $N_2$ and $H_2$. Further, in accordance with need, the surfaces of the external electrodes 4 may be formed with a covering layer (pad layer) using plating technique, etc.

The thus produced multi-layer ceramic capacitor 1 of the present embodiment has an excellent capacity-temperature characteristics, particularly, an insulation resistance becomes hard to be deteriorated even when the above dielectric layer 2 is made to have an interlayer of, for example, about 4 μm and the defect rate of an initial insulation resistance can be reduced.

The thus produced multi-layer ceramic capacitor 1 is mounted by soldering, etc. onto a printed circuit board for use in various types of electronic equipment.

Note that an embodiment of the present invention was explained as above, however, the present invention is not limited to the above embodiment and may be modified in various ways within the scope of the invention.

For example, the dielectric ceramic composition obtained by a production method according to the present invention is not limited to be used for a multi-layer ceramic capacitor and may be used for an electronic device wherein a dielectric layer is formed.

Next, examples wherein the embodiment of the present invention is described more specifically and the present invention will be explained further in detail. Note that the present invention is not limited to the embodiments.

EXAMPLE 1

In the present embodiment, at first, as starting materials for preparing dielectric material, a main component material ($SrCO_3$, $CaCO_3$, $TiO_2$) and the first to fourth subcomponents materials respectively having an average particle diameter of 0.1 to 1 μm were prepared. In the present embodiment, carbonate (the second subcomponent: $MnCO_3$) was used for a material of MnO, and oxides (the first subcomponent: $V_2O_5$, the third subcomponent: $SiO_2$+CaO, the fourth subcomponent: $Y_2O_3$) were used as other materials.

Next, $SrCO_3$, $CaCO_3$ and $TiO_2$ are measured for a predetermined amounts so as to attain m' shown in Table 1, subjected to calcining at 1200° C. and a main component source material expressed by a composition formula of $\{(Sr_{0.64}Ca_{0.36})O\}_{m'}\cdot TiO_2$ was obtained.

The main component source material is added a predetermined amounts of $V_2O_5$, $MnCO_3$, ($SiO_2$+CaO) and $Y_2O_3$, furthermore, predetermined amounts of $SrCO_3$, $CaCO_3$ and $TiO_2$ are added, and measured so that the composition after firing becomes the blending ratio shown in the respective samples in Table 1 to Table 3 in $\{(Sr_{0.64}Ca_{0.36})O\}_{m'}\cdot TiO_2$ (main component)+$V_2O_5$ (first subcomponent)+$MnCO_3$ (second subcomponent)+($SiO_2$+CaO) (third subcomponent)+$Y_2O_3$ (fourth subcomponent). Then dielectric ceramic compositions (dielectric materials) were obtained by performing wet mixing using a ball mill for 16 hours and drying, respectively.

A dielectric layer paste was prepared by mixing by a ball mill to make a paste 100 parts by weight of the thus obtained dried material, 4.8 parts by weight of acrylic resin, 40 parts by weight of methylene chloride, 20 parts by weight of ethyl acetate, 6 parts by weight of mineral spirits and 4 parts by weight of acetone.

Then, an internal electrode paste was obtained by kneading using a triple-roll to make a paste 100 parts by weight of Ni particles having an average particle size of 0.2 to 0.8 μm, 40 parts by weight of an organic vehicle (8 parts by weight of an ethyl cellulose resin dissolved in 92 parts by weight of butyl carbitol), and 10 parts by weight of butyl carbitol.

An external electrode paste was prepared by kneading together to make a paste 100 parts by weight of Cu particles having an average particle size of 0.5 μm, 35 parts by weight of an organic vehicle (8 parts by weight of an ethyl cellulose resin dissolved in 92 parts by weight of butyl carbitol), and 7 parts by weight of butyl carbitol.

Next, the above dielectric layer paste was used to form a green sheet having a thickness of 6 μm and 3 μm on a PET film. An internal electrode paste was printed on this, then the green sheet was peeled from the PET film. Next, the thus obtained green sheets and protection green sheet (on which the internal electrode layer paste is not printed) were layered, adhered by a pressure to prepare a green chip. The number of layered layers of the green sheet having the internal electrode was four.

First, the green chip was cut to a predetermined size and was processed to remove the binder, fired, and annealed (heat treatment) to obtain the multi-layer ceramic fired body.

The process of removing the binder was performed under conditions that a time of temperature rise was 15° C./hour, a holding temperature was 280° C., a holding time was 8 hours and in the air atmosphere. Firing was performed under the conditions that the rate of temperature rise was 200° C./hour, a holding temperature was 1200 to 1380° C., a holding time was 2 hours, the rate of cooling was 300° C./hour, and in an atmosphere of wet mixed gas of $N_2$+$H_2$ (an oxygen partial pressure was adjusted to $2\times10^{-7}$ to $5\times10^{-4}$ Pa). Annealing was performed under the conditions that a holding temperature was 900° C., a temperature holding time was 9 hours, the rate of cooling was 300° C./hour and in a wet $N_2$ gas atmosphere (an oxygen partial pressure was $3.54\times10^{-2}$ Pa). Note that a wetter having a water temperature of 35° C. was used for wetting the atmosphere gases at the time of firing and annealing.

Next, external electrodes were formed by polishing the end faces of the multi-layer ceramic fired body by sandblasting, then transferring the external electrode paste to the end faces and firing them in a wet $N_2$+$H_2$ atmosphere at 800° C. for 10 minutes, so as to obtain a sample of a multi-layer ceramic capacitor 1 having the configuration as shown in FIG. 1.

The size of the thus obtained respective samples was 3.2 mm×1.6 mm×0.6 mm, the number of dielectric layers sandwiched by the internal electrode layers was 4 and the thickness thereof was 4 μm and 2 μm, and the thickness of the internal electrode layer was 1.5 μm. The characteristics below of the respective samples were evaluated.

Dielectric Constant (ε) and Insulation Resistance (IR)

The electrostatic capacity of each of the samples of the capacitors was measured under conditions of a frequency of 1 kHz and an input signal level (measurement voltage) of 1 Vrms at a reference temperature of 25° C. by a digital LCR meter (4274A made by YHP). Further, the relative dielectric constant (no unit) was calculated from the obtained electrostatic capacity, electrode dimensions of the capacitor sample, and thickness of dielectric layers.

Next, using an insulation resistance meter (R8340A made by Advantest), the insulation resistance IR after applying 50V DC to the capacitor sample at 25° C. for 60 seconds was measured. The specific resistance ρ (unit: Ωcm) was calculated from the measured value and the electrode area and thickness of the dielectric layers. The results are shown in Table 1 to Table 3.

For evaluation, the dielectric constant ε is important for preparing a small sized high dielectric constant capacitor. One of at least 180, more preferably at least 200, is considered good. The specific resistance of at least $1 \times 10^{12}$ Ωcm is considered good. The dielectric constant ε was defined as the averages of 10 capacitors of each sample. The specific resistance ρ was defined as the averages of 10 capacitors of good sample.

Temperature Characteristics of Capacitance

The electrostatic capacity at 1 kHz and a voltage of 1V was measured for each sample of the capacitors. It was investigated if the rate of change of the electrostatic capacity with respect to temperature was −2000 to 0 ppm/° C. in a temperature range of 20 to 85° C. when making the reference temperature 20° C. Those which fulfill are checked ○ and those which do not fulfill were checked x. The results are shown in Table 1 to Table 3.

Defect rate of Initial Insulation Resistance (IR)

Values of the defect rate of the initial IR are respectively obtained by calculating the specific resistance ρ of about 100 capacitor samples by calculating from the insulation resistance IR, the electrode area and the thickness of the dielectric layer (4 μm and 2 μm in the present embodiment). Then, the number of samples having a smaller value by one digit or more than the specific resistance value p in a bulk state is divided by the whole number and indicated by percentages. The results are shown in Table 1 to Table 3. The smaller the value, the less the initial IR defect rate and the more good ones.

TABLE 1

| Sample no. | Total evaluation | Main component | | | | | Firing temp. (° C.) | Dielectric constant ε | Specific resistance ρ (Ω cm) | Capacity-temp. characteristic | Thickness of dielectric layers (μm) | Initial IR defect rate (%) |
|---|---|---|---|---|---|---|---|---|---|---|---|---|
| | | m' of source material | Mole value of subsequent adding | | | m of final | | | | | | |
| | | | Sr | Ca | Ti | | | | | | | |
| 1 | X | 1.017 | 0 | 0 | 3.25 | 0.985 | 1260 | — | — | — | 4 | 100 |
| 2 | X | 1.001 | 0 | 0 | 1.62 | 0.985 | 1200 | 214 | 1E + 14 | ○ | 4 | 80 |
| 3-1 | ○ | 0.984 | 0.064 | 0.036 | 0 | 0.985 | 1220 | 211 | 5E + 13 | ○ | 4 | 33.3 |
| 3 | ○ | 0.946 | 2.5 | 1.4 | 0 | 0.985 | 1260 | 214 | 2.3E + 13 | ○ | 4 | 16.7 |
| 3-2 | ○ | 0.91 | 4.8 | 2.7 | 0 | 0.985 | 1380 | 202 | 7E + 12 | ○ | 4 | 15 |

Mole value of first subcomponent ($V_2O_5$) converted to V = 0.1 mole
Mole value of second subcomponent ($MnCO_3$) converted to Mn = 0.37 mole
Mole value of third subcomponent ($SiO_2$ + CaO) = (2.5 + 2.5) moles
Mole value of fourth subcomponent ($Y_2O_3$) converted to Y = 0.07 mole

TABLE 2

| Sample no. | Total evaluation | Main component | | | | | Firing temp. (° C.) | Dielectric constant ε | Specific resistance ρ (Ω cm) | Capacity-temp. characteristic | Thickness of dielectric layers (μm) | Initial IR defect rate (%) |
|---|---|---|---|---|---|---|---|---|---|---|---|---|
| | | m' of source material | Mole value of subsequent adding | | | m of final | | | | | | |
| | | | Sr | Ca | Ti | | | | | | | |
| 3-3 | X | 1.017 | 0 | 0 | 1.19 | 1.005 | 1380 | — | — | — | 2 | 100 |
| 3-4 | X | 1.006 | 0 | 0 | 0.1 | 1.005 | 1380 | 202 | 1E + 14 | ○ | 2 | 75 |
| 3-5 | ○ | 1.001 | 0.26 | 0.14 | 0 | 1.005 | 1380 | 198 | 2.9E + 14 | ○ | 2 | 73 |
| 3-6 | ○ | 0.985 | 1.28 | 0.72 | 0 | 1.005 | 1380 | 203 | 1E + 13 | ○ | 2 | 68 |
| 3-7 | ○ | 0.93 | 4.8 | 2.7 | 0 | 1.005 | 1380 | 192 | 4E + 12 | ○ | 2 | 49 |

Mole value of first subcomponent ($V_2O_5$) converted to V = 0.1 mole
Mole value of second subcomponent ($MnCO_3$) converted to Mn = 0.37 mole
Mole value of third subcomponent ($SiO_2$ + CaO) = (2.5 + 2.5) moles
Mole value of fourth subcomponent ($Y_2O_3$) converted to Y = 0.07 mole

TABLE 3

| Sample no. | Total evaluation | Main component | | Firing temp. (° C.) | Dielectric constant $\epsilon$ | Specific resistance $\rho$ ($\Omega$ cm) | Capacity-temp. characteristic | Thickness of dielectric layers ($\mu$m) | Initial IR defect rate (%) |
|---|---|---|---|---|---|---|---|---|---|
| | | m' of source material | m of final | | | | | | |
| 4 | X | 0.938 | 0.94 | 1220 | —* | —* | —* | —* | —* |
| 5 | ○ | 0.938 | 0.985 | 1260 | 214 | 2.3E + 13 | ○ | 4 | 16.7 |
| 6 | ○ | 0.938 | 1.02 | 1380 | 226 | 2E + 14 | ○ | 4 | 23 |
| 7 | X | 0.938 | 1.08 | 1380 | —** | —** | —** | —** | —** |

Mole value of first subcomponent ($V_2O_5$) converted to V = 0.1 mole
Mole value of second subcomponent ($MnCO_3$) converted to Mn = 0.37 mole
Mole value of third subcomponent ($SiO_2$ + CaO) = (2.5 + 2.5) moles
Mole value of fourth subcomponent ($Y_2O_3$) converted to Y = 0.07 mole
*= semiconductive
**= densification not possible Mole values of an amounts of subsequent adding in Table 1 to Table 3 are ratios with respect to 100 moles of the final composition of the main component. Mole values of the first to fourth subcomponents in Table 1 to Table 3 are ratios with respect to 100 moles of the main component. Also in Table 1 to Table 3, mE+n indicates $m \times 10^{+n}$ in the specific resistance ($\rho$) values.

From the results shown in Table 1 and Table 2, the facts below would be understood as to the relationship between the m value of the final and the m' value of the source material of the main component. In the samples 3 to 3-2, 3-5 to 3-7 wherein m'<m, it was confirmed that the initial IR defect rate is reduced. Particularly, in the samples 3, 3-2, 3-6 and 3-7 having the smaller m' value of the source material, the initial IR defect rate was remarkably reduced. On the other hand, as in the samples 1 to 2, 3-3 and 3-4 wherein m'>m, it was confirmed that the initial IR defect rate is increased.

From the result shown in FIG. 3, the facts below are understood as to the final value m of the main component. As in the sample 4 wherein m=0.94, it was confirmed that the dielectric was reduced by firing in a reducing atmosphere and sufficient insulation resistance could not be obtained, consequently it did not function as a capacitor. While, as in the sample 7 wherein m=1.08, it was confirmed that densified sintered body could not be obtained even if fired at 1380° C. (high temperature).

EXAMPLE 2

Figure 2:
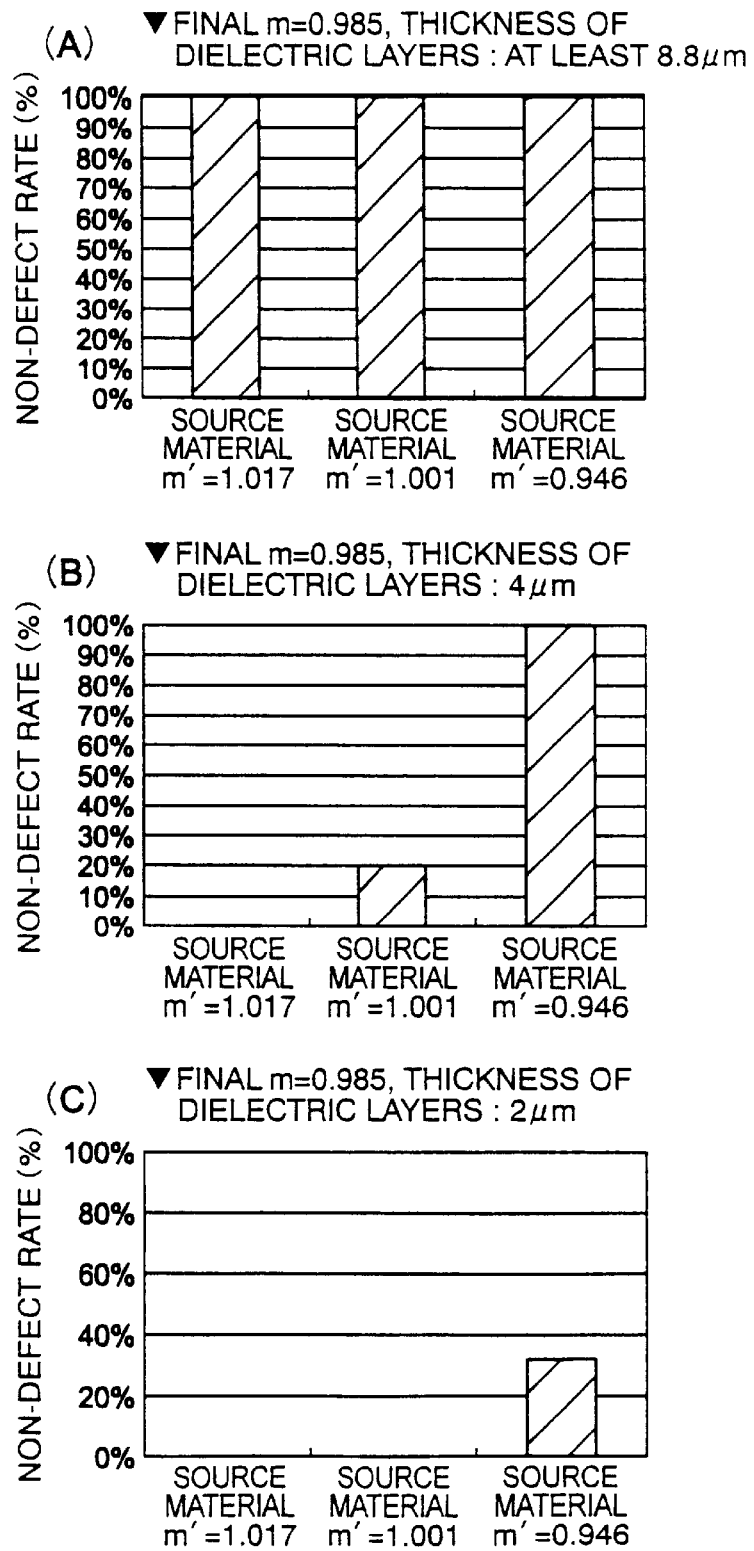
FIGS. 2A to 2C are graphs of a relationship of a value of a material m' and an defect rate of an initial insulation resistance when a thickness of a dielectric layer is changed.

A test of effects on the error occurrence rate of the initial insulation resistance by the material value m' of the main component when the thickness of the dielectric layer is changed to be 8.8 $\mu$m or more, 4 $\mu$m and 2 $\mu$m was conducted. Note that the final m of the main component was made to be m=0.985. Results of the rate of good ones are shown in FIGS. 2A to 2C, wherein the m' value does not particularly affect on the error occurrence rate when the thickness is 8.8 $\mu$m or more (see FIG. 2A), and that it is confirmed that making the material value m' smaller than the final value m becomes effective as the thickness becomes thinner to 4 $\mu$m and further to 2 $\mu$m (see FIGS. 2B and 2C). The initial IR defect rate value was obtained in the same way as in the Example 1.

What is claimed is:

1. A method of producing a dielectric ceramic composition containing a component expressed by a composition formula of $(AO)_m \cdot BO_2$, wherein the element A in said composition formula is at least one element selected from Sr, Ca and Ba, and the element B in said composition formula is at least one selected from Ti and Zr, including the steps of:

preparing a material expressed by a composition formula of $(AO)_{m'} \cdot BO_2$, wherein a mole ratio m' in said composition formula fulfills m'<m;

obtaining the component material by adding a substance containing said element A to the material and adjusting said mole ratio m' to m'=m; and producing said dielectric ceramic composition by firing composition materials including the component material.

2. A method of producing a dielectric ceramic composition containing a component expressed by a composition formula of $\{(Sr_{1-x}Ca_x)O\}_m \cdot (Ti_{1-y}Zr_y)O_2$, wherein the code x in said composition formula fulfills $0 \leq x \leq 1.00$ and the code y in said composition formula fulfills $0 \leq y \leq 0.20$, including the steps of:

preparing a material expressed by a composition formula of $\{(Sr_{1-x}Ca_x)O\}_{m'} \cdot (Ti_{1-y}Zr_y)O_2$, wherein the mole ratio m' in said composition formula fulfills m'<m;

obtaining the component material by adding a substance containing at least one of said Sr and Ca to the material and adjusting said mole ratio m' to m'=m; and producing said dielectric ceramic composition by firing composition materials including the main component material.

3. The method of producing a dielectric ceramic composition as set forth in claim 2, wherein relationship of the mole ratios m and m' in said composition formula fulfills m−m'<0.085.

4. The method of producing a dielectric ceramic composition as set forth in claim 2, wherein the mole ratio m in the composition formula in the main component of said dielectric ceramic composition fulfills 0.94<m<1.08.

5. The method of producing a dielectric ceramic composition as set forth in claim 3, wherein the mole ratio m in the composition formula in the main component of said dielectric ceramic composition fulfills 0.94<m<1.08.

6. A method of producing an electronic device comprising a dielectric layer constituting a dielectric ceramic composition containing a component expressed by a composition formula of $(AO)_m \cdot BO_2$, wherein the element A in said composition formula is at least one element selected from Sr, Ca and Ba, and the element B in said composition formula is at least one element selected from Ti and Zr, including the steps of:

preparing a material expressed by a composition formula of $(AO)_{m'} \cdot BO_2$, wherein the mole ratio m' said composition formula fulfills m'<m;

obtaining the main component material by adding a substance containing said element A to the material and adjusting said mole ratio m' to m'=m; and producing said dielectric ceramic composition by firing composition materials including the main component material.

7. A method of producing an electronic device comprising a dielectric layer constituting a dielectric ceramic composition containing a component expressed by a composition formula of $\{(Sr_{1-x}Ca_x)O\}_m \cdot (Ti_{1-y}Zr_y)O_2$, wherein the code x in said composition formula fulfills $0 \leq x \leq 1.00$ and the code y in said composition formula fulfills $0 \leq y \leq 0.20$, including the steps of:

preparing a material expressed by a composition formula of $\{(Sr_{1-x}Ca_x)O\}_m \cdot (Ti_{1-y}Zr_y)O_2$, wherein the mole ratio m' in said composition formula fulfills m'=m;

obtaining the component material by adding a substance containing at least one element of said Sr and Ca to the material and adjusting said mole ratio m' to m'=m; and producing said dielectric ceramic composition by firing composition materials including the component material.

8. A method of producing a dielectric ceramic composition, comprising a component expressed by a composition formula $\{(Sr_{1-x}Ca_x)O\}_m \cdot (Ti_{1-y}Zr_y)O_2$, wherein the code x fulfills $0 \leq x \leq 1.00$ and the code y fulfills $0 \leq y \leq 0.20$ in said composition formula, and a third subcomponent containing at least one selected from $SiO_2$, MO (note that M is at least one element selected from Ba, Ca, Sr and Mg), $Li_2O$ and $B_2O_3$, including the steps of:

preparing a material expressed by a composition formula $\{(Sr_{1-x}Ca_x)O\}_m \cdot (Ti_{1-y}Zr_y)O_2$, wherein the mole ratio m' in said composition formula fulfills m'<m;

obtaining the component material by adding a substance excepting sintering auxiliary agents containing at least one element of said Sr and Ca to the material and adjusting said mole ratio m' to m'=m;

obtaining composition materials including the component material and the third subcomponent material by adding to the component material at least a third subcomponent material to compose said third subcomponent after firing; and producing said dielectric ceramic composition by firing the composition materials.

9. The method of producing a dielectric ceramic composition as set forth in claim 8, wherein relationship of the mole ratios m and m' in said composition formulas fulfills m−m'<0.085.

10. The method of producing a dielectric ceramic composition as set forth in claim 8, wherein the mole ratio m in the composition formula of the component in said dielectric ceramic composition is 0.94<m<1.08.

11. A method of producing an electronic device, comprising a dielectric layer constituting a dielectric ceramic composition comprising a component expressed by a composition formula $\{(Sr_{1-x}Ca_x)O\}_m \cdot (Ti_{1-y}Zr_y)O_2$, wherein the code x fulfills $0 \leq x \leq 1.00$ and the code y fulfills $0 \leq y \leq 0.20$ in said composition formula, and a third subcomponent containing at least one selected from $SiO_2$, MO, wherein M is at least one element selected from Ba, Ca, Sr and Mg, $Li_2O$ and $B_2O_3$, including the steps of:

preparing a material expressed by a composition formula $\{(Sr_{1-x}Ca_x)O\}_m \cdot (Ti_{1-y}Zr_y)O_2$, wherein the mole ratio m' in said composition formula fulfills m'<m;

obtaining the component material by adding a substance excepting sintering auxiliary agents) containing at least one element of said Sr and Ca to the material and at least adjusting said mole ratio m' to m'=m;

obtaining composition materials including the component material and the third subcomponent material by adding to the component material a third subcomponent material to compose said third subcomponent after firing; and producing said dielectric ceramic composition by firing the composition materials.

* * * * *